Sept. 10, 1935.  N. W. MORSE  2,014,113
LUBRICATOR
Filed April 3, 1931   3 Sheets-Sheet 1
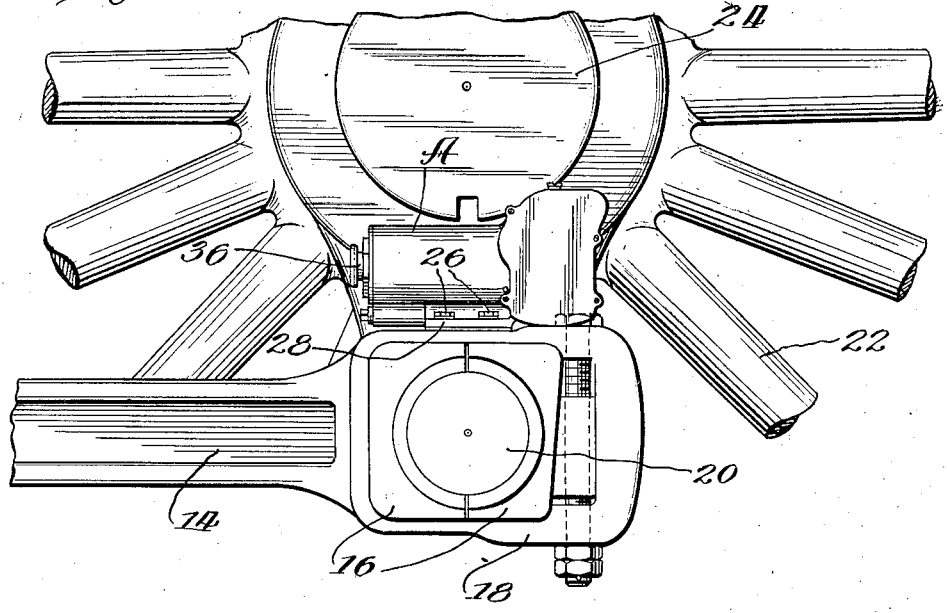
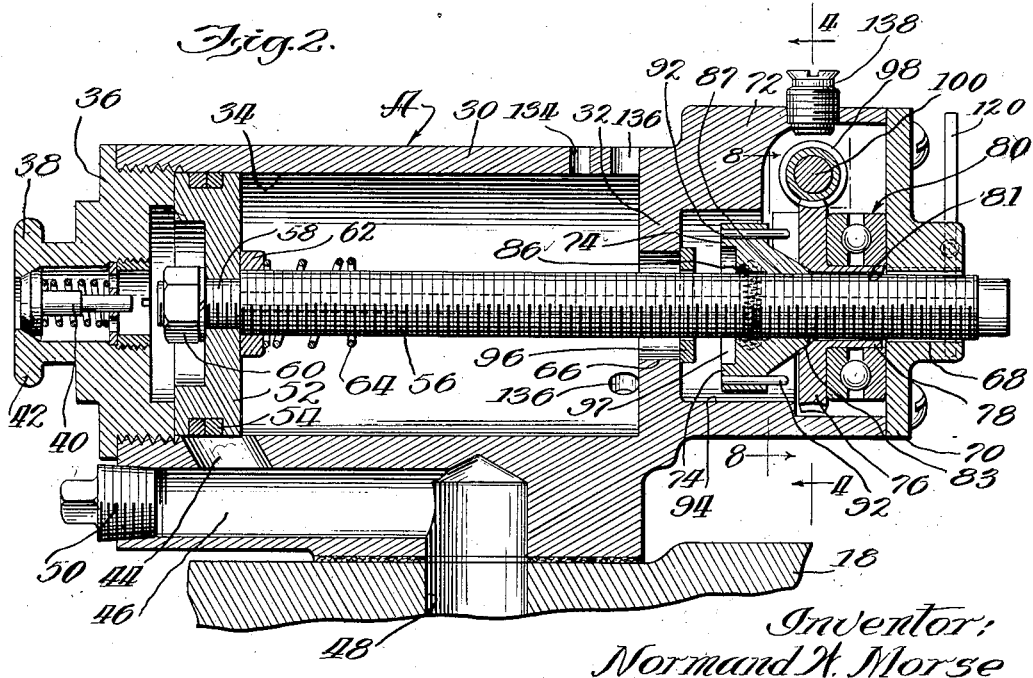
Inventor:
Normand W. Morse
By Williams, Bradbury,
McCaleb & Hinkle
Attys.

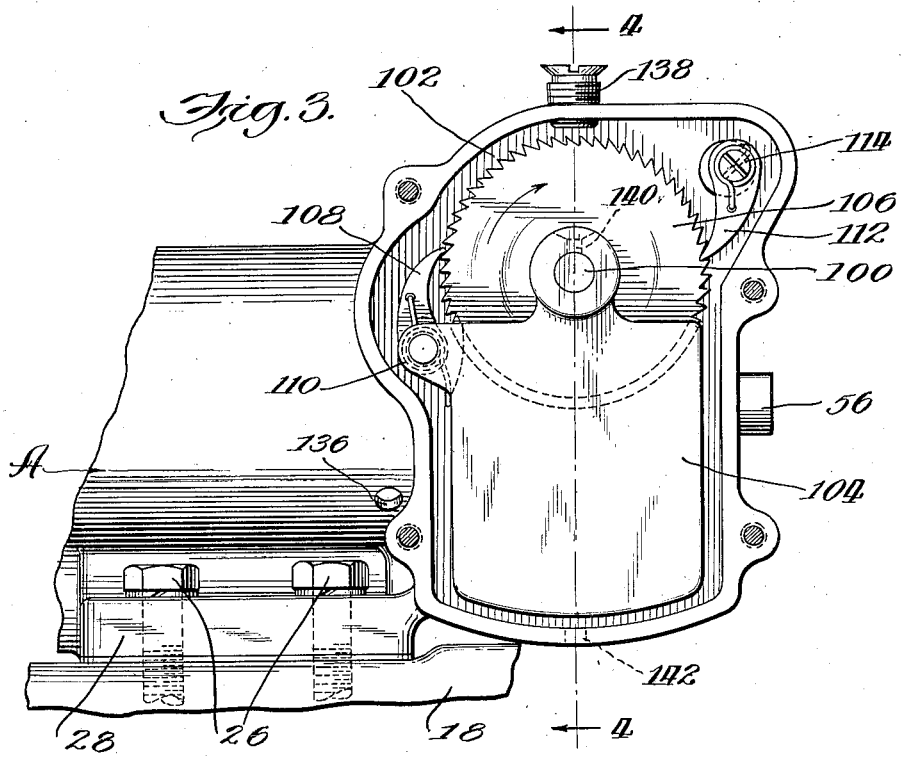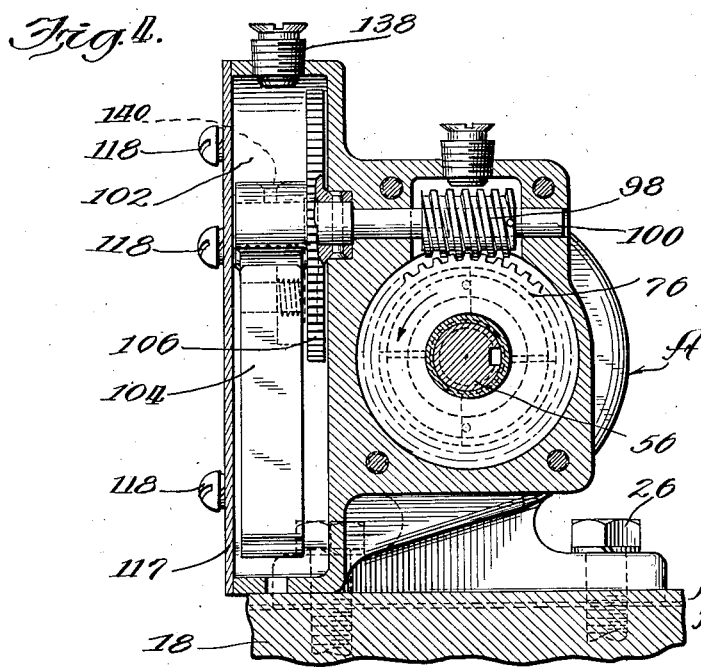

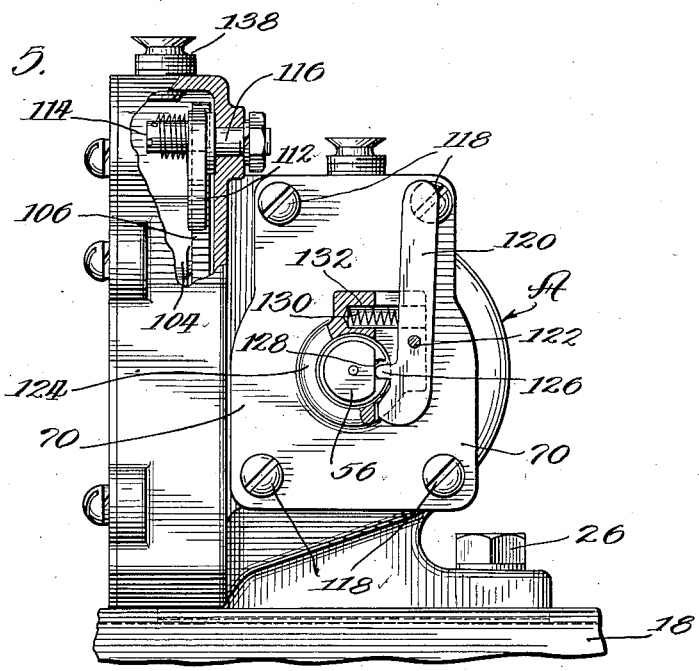

Patented Sept. 10, 1935

2,014,113

UNITED STATES PATENT OFFICE 2,014,113

LUBRICATOR

Normand W. Morse, Chicago, Ill., assignor, by mesne assignments, to Stewart-Warner Corporation, Chicago, Ill., a corporation of Virginia Application April 3, 1931, Serial No. 527,503

12 Claims. (Cl. 184—37)

My invention relates to lubricating apparatus, and more particularly to improved lubricating means for the connecting rod bearings of a locomotive.

It is customary to lubricate the connecting rod bearings and similar bearings of railway locomotives with an extremely heavy lubricant having substantially the consistency of soap, and which requires extremely high pressure to force it into the bearings to be lubricated. In the common construction of locomotives, the connecting rod and similar parts are provided with pockets, each adjacent a bearing to be lubricated and connected thereto by a lubricant passageway, these pockets serving as grease receptacles and having closure plugs threaded into the upper end thereof. Two men are usually required to lubricate a locomotive and the lubricating operation is carried out as follows:

The threaded plug is first removed from a pocket and one end of a lubricant containing barrel is threaded into the pocket. This barrel is provided with a piston advanced by a threaded stem extending through the other end of the barrel, and this threaded stem is rotated by means of a long wrench to force grease from the barrel into the pocket. This serves merely to fill the pocket with grease and is not relied upon to force grease into the bearing. Thereafter the cylinder is unscrewed from the pocket and the threaded plug screwed into the upper end thereof. This plug is now turned by means of a heavy wrench and in this manner sufficient pressure is exerted on the grease in the pocket to force it into the bearing.

It will be apparent that this operation is laborious and time-consuming, and is particularly disadvantageous for lubricating the locomotives of fast trains, since it is customary to lubricate the locomotive bearings of even the fastest trains at least once during the run of each locomotive, and this necessitates stopping the train for a considerable period of time. While the lubrication of the connecting rod bearings of a locomotive is possible with the ordinary grease guns which are attached to suitable fittings upon the bearings, yet the provision of an automatic high pressure lubricating unit, such as is commonly used to lubricate the bearings of automobiles, automotive machinery, etc., has not been found practical. One of the reasons for this is that the automatic lubricators commonly in use upon automobiles, automotive machinery, etc., dispenses a relatively light grease or oil at pressures considerably less than those necessary to lubricate the connecting rod bearings of railway locomotives.

One of the principal objects of my invention is to provide an automatic lubricator for the connecting rod bearings arranged to be mounted thereon and adapted to supply lubricant to these bearings continuously at a rate proportionate to the speed of the locomotive.

A further object is to provide an automatic lubricator of this type having a self-contained motor therein for forcing lubricant under pressure to the bearings.

A further object is to provide a lubricator of this type having a motor therein for forcing lubricant under pressure to the bearings, the motor adapted to operate only when the locomotive is in motion.

A further object is to provide an improved lubricator having inertia operated means therein for discharging lubricant to the bearing under pressure.

Still another object is to provide an improved lubricator of this type having a built-in lubricant reservoir and improved means for refilling said reservoir in a quick and expedient manner.

A further object is to provide an improved lubricating unit capable of attachment to a connecting rod bearing of a locomotive and adapted to operate to discharge lubricant to the bearing under pressure, the lubricator capable of receiving its power from the oscillatory movement of the connecting rod.

In its broadest form the invention contemplates the provision of an improved automatic lubricator capable of attachment to a moving arm of a machine and capable of receiving power to discharge lubricant under pressure from the movement of the arm upon which it is mounted.

Other objects and advantages of my invention will be more clearly set forth in the following description wherein reference is had to the accompanying drawings, in which Fig. 1 is a fragmentary side elevational view of a locomotive wheel and connecting rod with my improved lubricator mounted thereon;

Fig. 2 is a longitudinal sectional view, on a larger scale, of the lubricator;

Fig. 3 is an enlarged fragmentary view of the lubricator seen from the same direction as Fig. 1, with the cover plate of the motor housing removed;

Fig. 4 is a vertical sectional view taken on the line 4—4 of Fig. 3;

Fig. 5 is an end view of the lubricator, taken from the right of Fig. 1, a portion of the housing being broken away in section to more clearly illustrate other parts;

Fig. 6 is a fragmentary view of a portion of the lubricator, illustrating the piston in the position it occupies when the reservoir is filled with grease;

Fig. 7 is a fragmentary view similar to Fig. 6, illustrating a changed position of the clutch members; and Fig. 8 is a vertical sectional view of a fragment of the lubricator, taken on the line 8—8 of Fig. 6.

I have shown my improved lubricator, designated generally by the letter A, as being positioned upon the upper surface of a connecting rod 14 of a locomotive. The connecting rod is of the usual type provided with the split bearing plates 16, which are contained in a frame 18 formed at the end of the connecting rod, whereby the connecting rod is secured to the crank pin 20 of a locomotive wheel 22. The wheel 22 may be mounted upon the axle 24 of the locomotive in any well-known manner. The lubricator A, as previously mentioned, is mounted upon the frame 18 of the connecting rod and secured thereto by bolts 26 which pass through a lower flange 28 of the lubricator and are screw-threadedly secured in suitable openings in the frame 18.

Referring now to Fig. 2, the lubricator A comprises a longitudinal housing 30 which is generally separated into two compartments by a wall 32. One compartment may comprise the cylindrical reservoir 34 which is screw-threaded at one end to receive a closure member 36. Closure member 36 may be a lubricant receiving fitting of the type provided with an inlet end 38 in which a valve member 40 is positioned. The inlet end is provided with the usual flange 42 over which a lubricant compressor coupling is adapted to engage to charge the reservoir with lubricant. A port 44 connects the forward end of the reservoir with a passageway 46 formed in the lower portion of the housing and through which lubricant is conducted to an aligned opening 48 in frame 18 of the connecting rod which communicates with the bearing to be lubricated. The passageway 46 is closed at its outer end by a plug 50. A piston 52 is mounted in the cylindrical reservoir 34 provided with piston rings 54 which insure against leakage past the piston when grease is being discharged under a high pressure. The piston is mounted upon a threaded rod 56, being secured upon a reduced shank 58 thereof by a suitable lock nut 60. A collar 62 is positioned on rod 56 adjacent the piston and a short length 64 of a compressible coiled spring is likewise mounted on rod 56, normally positioned bearing against collar 62.

Rod 56 extends through an opening 66 in wall 32 and also through an opening 68 in a cover plate 70 which forms one wall of a clutch and transmission housing 72. A pair of clutch elements 74 are mounted upon rod 56, as well as a worm wheel 76 which has an extended hub 78. A friction reducing member comprising a ball-bearing unit 80 is mounted upon hub 78 between a side wall of worm wheel 76 and the inner side of cover plate 70.

Worm wheel 76 has a central bore 81 larger than the diameter of rod 56 and which tapers outwardly at 83. A plurality of shoulders or ledges 85 are formed on the side wall of the worm wheel. Each of these ledges has a sharp perpendicular side and a gradually curved side for a purpose to be hereinafter described.

The clutch members 74 comprise a pair of semi-cylindrical units, having, when pressed together to form a cylindrical unit, a central opening 86 therein through which rod 56 normally passes and which is larger than the diameter of rod 56. A portion 87 of the opening is screw-threaded so that in the position shown in Fig. 2, the clutch member acts as a nut upon rod 56. The units 74 are each provided with a pair of drilled openings 88 and a pair of compression springs 90 are mounted in these openings to press the units of the clutch apart.

The clutch members 74 are further provided with a pair of driving pins 92 which extend rearwardly therefrom. The clutch is mounted in a bored opening 94 in the housing 72 adjacent the wall 32. A washer 96 normally covers opening 66 through wall 32, being adapted, however, to enter a suitable opening 97 in clutch members 74.

Worm wheel 76 is geared to a worm 98 which is pinned to a horizontal shaft 100 which extends transversely from housing 72 to a compartment 102 within which an inertia weight 104 is provided, being mounted upon the end of shaft 100. A toothed ratchet wheel 106 is pinned to shaft 100 and is mounted within compartment 102. Means for advancing ratchet wheel 106 comprise a spring-pressed pawl 108 pivotally mounted upon a lug 110 extending to one side from the inertia weight 104. A second pawl 112 for holding ratchet wheel 106 in an advanced position is provided, mounted upon a pivot pin 114 which is eccentrically mounted upon a stud 116 extending through a wall of compartment 102. A cover plate 117 is provided for the front of compartment 102 and is secured thereto by suitable screw members 118.

From the description thus far, it will be apparent that as inertia weight 104 oscillates upon shaft 100, due to its momentum as the connecting rod oscillates back and forth, through the medium of pawl 108, ratchet wheel 106 is rotated step by step. By means of worm 100, worm wheel 76 is rotated. As worm wheel 76 rotates, the clutch members 74 are likewise rotated due to the ledges 85 bearing against pins 92. As the clutch units 74 rotate, due to the fact that they are threadedly mounted upon piston rod 56, and that rod 56 is prevented from turning by a lug 126 upon a lever 120 engaging in a slot, the piston rod will be moved forwardly in reservoir 34, thereby extruding grease through opening 44 and passageway 46.

When the piston 52 arrives in the position shown in Fig. 2, all the lubricant in the reservoir will have been discharged therefrom. In order to refill the reservoir in a quick and expeditious manner, means are provided for disengaging the clutch elements 74 so that the rod 56 may pass therethrough without engaging the threaded portions thereof. These means comprise a lever 120 mounted upon a pivot 122 in a boss 124 formed on the outside of cover plate 70.

Lever 120 has a forwardly extending lug 126 which normally rests in a slot 128 formed in one side of piston rod 56. A spring 130, mounted in a suitable bore 132 in boss 124, normally holds the lever in this position. When it is desired to recharge the reservoir the lever 120 is pressed to the left and the lug 126 is withdrawn from slot 128. A suitable crank means may now be attached to the extended end of rod 56 and the rod turned in a counter-clockwise direction.

Due to the fact that worm wheel 76 will be held stationary the clutch members 74 will be moved to the left during this turning movement, carrying with them the washer 96. After several turns have been made the clutch members will be sufficiently removed from the conical opening 83 in the worm wheel 76 that the springs 90 will cause the clutch members to spring apart.

A lubricant compressor of the type previously mentioned may now be connected to the lubricant receiving fitting 36 and lubricant forced into the reservoir 34. By this operation the piston 52 will be forced to the rear reservoir 34. When the reservoir is completely filled and the piston forced against wall 32, lubricant will extrude through opening 134, thereby indicating that the reservoir has been completely charged.

The clutch members 74 will likewise be restored to normal driving position by the foregoing filling operation. As the piston 52 is backed up in reservoir 34, spring 64 will be forced against washer 96 and force washer 96 into opening 97 and against the clutch units. Continued pressure will force the clutch units into driving engagement with rod 56 and the conically-shaped parts of the units against the tapered walls 83 in worm wheel 76. Thereafter, as when the locomotive is in motion and the inertia weight is actuated, worm wheel 76 will revolve the clutch units to advance the piston.

Means for admitting atmospheric pressure, as the lubricant in the reservoir is discharged, is provided in the form of openings 136 positioned around the cylinder wall at the rear end thereof. These openings also provide means whereby grease which escapes to the rear of the piston or other sediment which may collect in the reservoir, may be forced out in a filling operation. A pair of sealed lubricant fittings 138 are mounted, one above the transmission compartment and one above the inertia motor compartment. The fitting in compartment 102 is positioned directly above a drilled opening 140 in the upper end of inertia weight 104, whereby lubricant in the form of thin oil, may be dropped upon shaft 102 and the overflow will run down the inertia weight 104 and pass through an opening 142 in the bottom of the compartment casing. This eliminates any possibility of having a surplus supply of lubricant fill or partially fill compartment 102 and thereby damp the inertia weight operation.

From the foregoing description, it will be apparent that a highly efficient and rugged compressor of a type particularly adapted for forcing a semi-hard or plastic grease to a bearing, has been provided. It will likewise be apparent that a device has been provided which is incapable of becoming out of order and which is not easily broken. Due to the provision of separate compartments for the motor, the transmission and the grease, whereby either one of these compartments may be entered without disturbing the others, a very practical commercial device has been provided.

It will likewise be noted that in assembling the pawl and ratchet mechanism, the stud 116 upon which pivot pin 114 of pawl 112 is secured, is capable of adjustment so that the correct relationship between the pawls may be quickly and easily secured. The improved method of disengaging the clutch members insures the quick and easy filling of the grease reservoir.

While I have illustrated and described a specific embodiment of the invention, it will be apparent to those skilled in the art that changes and modifications may be made without departing from the spirit of the invention. What I desire to secure and protect by Letters Patent of the United States is:

1. A lubricator unit comprising a housing having a grease chamber and a motor compartment adapted to be mounted upon a movable bearing, a piston in said chamber, a piston rod secured thereto, an inertia motor comprising a weight mounted for rocking movement in a vertical plane in said compartment, a reduction gearing driven by said motor, a split nut clutch rotatable on said piston rod and connecting said gearing to said piston rod for advancing said piston in said chamber, and manipulative means for disengaging said clutch from said gearing and said piston rod to render said motor ineffective for advancing said piston.

2. An integral lubricator unit comprising a grease reservoir and a motor compartment, a pump plunger in said reservoir, a piston rod secured to said plunger for advancing the same in said reservoir to expel grease therefrom, a rocking weight mounted in said motor compartment, and a power transmission interposed between said weight and said piston rod comprising a pawl and ratchet wheel cooperable with said weight, a worm and worm wheel driven by said ratchet wheel, a plurality of fingers carried by said worm wheel, a split nut clutch rotatable on said rod, and driving pins carried by said clutch engageable by said fingers.

3. An integral lubricator unit comprising a grease reservoir and a motor compartment, a piston and threaded piston rod in said reservoir, a rocking weight mounted within said compartment, means for transmitting the motion of said weight to said piston to advance said piston in said reservoir to discharge grease therefrom comprising, a worm and worm wheel, a pawl and ratchet connection between said weight and said worm, and a clutch forming a driving connection between said worm wheel and said rod, said clutch being rotatable on said piston rod and having parts capable of intermeshing engagement with the threads on said rod, a valved inlet port providing a fitting for charging said reservoir; manipulative means for disengaging said clutch from said rod during a reservoir charging operation to permit the retraction of said piston in said reservoir, and means automatically operated upon retraction of said piston to cause engagement of said clutch.

4. A lubricator unit comprising a grease reservoir and a motor compartment, a piston in said reservoir for discharging grease therefrom, a threaded piston rod secured to said piston, advancing means associated therewith comprising an inertia weight vertically mounted within said motor compartment, a worm and worm wheel, a pawl and ratchet connection associated with said weight for driving said worm, and a clutch member operatively engageable with both said worm wheel and the threads on said piston rod, manually operable means for disengaging said clutch from said rod and from said worm wheel, and means operated upon retraction of said piston to cause engagement of said clutch and a valved port providing a connection for charging said reservoir, said piston being adapted to be retracted in said reservoir by the charging thereof when said clutch is disengaged from said piston rod.

5. An integral lubricator unit adapted to be secured to a reciprocating element comprising a grease chamber, a piston reciprocably mounted in said chamber, a piston rod secured to said piston, an inertia motor including a rocking weight, a power transmission driven by said motor and adapted to be connected to said piston rod to advance said piston in said chamber, a split nut clutch threadedly engageable with said piston rod for operatively connecting said power transmission with said piston rod to advance said piston in said chamber, and manipulative means for disengaging said clutch from said piston rod.

6. An integral lubricator unit adapted to be secured to a movable bearing, comprising a grease chamber, a transmission chamber and a motor chamber, a piston in said grease chamber having a piston rod extending through said transmission chamber, an inertia motor including a rocking weight mounted in said motor chamber, a power transmission in said transmission chamber driven by said motor, an annular expansible clutch operatively disposed between said transmission and said piston rod, and camming means carried by said transmission being adapted to engage said clutch and contract the same thereby to effect driving engagement with said piston rod, whereby said weight will be rendered operative to advance said piston in said chamber.

7. A lubricator unit having a grease reservoir and a motor compartment, a splined threaded shaft secured to said piston, a rocking weight vertically mounted within said compartment, a pawl and ratchet wheel associated therewith, a worm and worm wheel driven thereby, a rotatable clutch cooperable with said worm wheel and threadedly engageable with said shaft, a key engageable with said splined shaft to prevent rotation of the same, a manipulative lever for disengaging said key from said shaft, and means for manually rotating said shaft to disengage said clutch therefrom to permit the recharging of the reservoir and the retraction of the piston therein.

8. An automatic lubricator for movable bearings comprising a lubricant chamber arranged to be connected to the bearing to be lubricated, a rocking weight mounted in said lubricator, a plunger for ejecting lubricant from said chamber, and a power transmission connecting said weight with said plunger to advance the same in the chamber to eject lubricant therefrom, said transmission comprising a threaded rod connected to said plunger, a split nut clutch engageable with said threaded rod, resilient means for forcing said split nut clutch means into engagement with said threaded rod when said plunger is adjacent one end of its stroke, a worm wheel freely rotatable upon said threaded rod and rotated by movement of said inertia weight, and means associated with said worm wheel to rotate said clutch when the latter is in engagement with said rod.

9. In a lubricator unit, a grease chamber having a valved inlet and a discharge port at one end thereof, a piston reciprocably mounted in said chamber having a threaded rod extending through the end of said chamber opposite said ports, a rotatable clutch member threadedly engageable with said rod, an inertia motor including a rocking weight, mechanism driven thereby and cooperable with said clutch member to advance said piston toward the discharge end of said chamber to expel the contents thereof through the discharge port; and manipulative means comprising, a manually operable lever having means for holding said threaded rod against rotative movement, and a projection on said rod cooperable with a crank for disengaging said clutch member from said rod; said piston being retractible in said chamber by the charging thereof through said valved inlet port when said clutch member is disengaged from said rod.

10. In a lubricator unit of the class described, a piston, a piston rod secured thereto, a worm wheel freely rotatable with respect to said rod, a split nut clutch threadedly engageable with said rod and operatively connecting said piston and said worm wheel, a spring carried by said rod adjacent said piston, and means carried by said worm wheel for engaging said clutch, said spring adapted to urge said clutch into engagement with said worm wheel when the piston is at one end of its stroke.

11. An inertia operated lubricator unit comprising a piston, a piston rod, a worm wheel freely rotatable with respect to said rod and connected to the driving mechanism, an annular expansible cone-faced clutch threadedly engageable with said rod and operatively disposed between said piston and said wheel, driving pins carried by said clutch, camming lugs carried on said wheel cooperable with said cone-faced clutch, and a spring on said rod adjacent said piston for urging said clutch into engagement with said camming lugs for effecting the threaded engagement of said clutch with said rod when said piston is at one end of its stroke.

12. A lubricator unit comprising a housing having a grease chamber and a motor compartment and adapted for attachment to a movable bearing, a piston in said chamber movable for expelling grease therefrom, a threaded piston rod secured to said piston for moving the same, an inertia weight positioned in said motor compartment and operable upon movement of the bearing for providing a source of power for moving said piston to expel grease from said chamber, a reduction gearing driven by the movement of said inertia weight, a clutch member operable for connecting said reduction gearing to said threaded piston rod for moving said piston in said chamber, manually operable means to disengage said clutch member from both said reduction gearing and said threaded piston rod to render said inertia weight ineffective for moving said piston, and means operable by said piston upon movement thereof to its retracted position to cause engagement of said clutch member.

NORMAND W. MORSE.